(12) United States Patent
Kropidlowski

(10) Patent No.: US 6,441,599 B1
(45) Date of Patent: Aug. 27, 2002

(54) REFERENCE POINT LOCATOR FOR RESIDENTIAL AND COMMERCIAL CONSTRUCTION

(76) Inventor: Donald S. Kropidlowski, 2156 S. 67$^{th}$ Pl., West Allis, WI (US) 53219

( * ) Notice: Subject to any disclaimer, the term of this patent is extended or adjusted under 35 U.S.C. 154(b) by 0 days.

(21) Appl. No.: 09/493,451

(22) Filed: Jan. 28, 2000

(51) Int. Cl.$^7$ .................. G01R 19/00; G01R 33/00; G01V 3/10; G02F 1/133

(52) U.S. Cl. .................... 324/67; 324/207.26

(58) Field of Search .............. 324/67, 207.26, 324/202.17, 326, 228, 133, 528, 529; 340/653, 654

(56) References Cited

U.S. PATENT DOCUMENTS

| | | | |
|---|---|---|---|
| 3,704,413 A | | 11/1972 | Blevins |
| 3,836,842 A | | 9/1974 | Zimmermann et al. |
| 4,837,489 A | | 6/1989 | McFee |
| 4,853,617 A | | 8/1989 | Douglas et al. |
| 4,998,058 A | * | 3/1991 | Tofte et al. .................... 324/67 |
| 5,955,879 A | | 9/1999 | Durdle et al. |

OTHER PUBLICATIONS

Etcon Corp., Bulletin No. B20, Apr. 17, 1995, pp. 1, 4 "Circuit Tracers".

* cited by examiner

Primary Examiner—Walter E. Snow
(74) Attorney, Agent, or Firm—Boyle Frederickson Newholm Stein & Gratz S.C.

(57) ABSTRACT

A portable electronic reference point locator facilitates location of a reference point, located on one side of a structure (such as a wall, floor or ceiling), from the opposite side of the structure. The system is particularly useful when installing new electrical wiring or hardware, when installing new plumbing, or when performing other construction related tasks that require the location of one side of a structure to be determined relative to the other side of the structure. The system comprises a transmitter and a receiver. The transmitter is located at a position that defines the reference point, and includes an oscillator and an antenna that cooperate to generate and transmit an electromagnetic signal. The receiver includes a transducer that senses the electromagnetic signal transmitted by the transmitter, and an indicator that indicates whether the receiver is within a given distance of the transmitter. The locator uses different types of indicators, including audible indicators (such as a headphone set), visual indicators (such as one or more lights or LEDs), and tactile indicators (such as a vibratory indicator).

9 Claims, 4 Drawing Sheets

REFERENCE POINT LOCATOR FOR RESIDENTIAL AND COMMERCIAL CONSTRUCTION

BACKGROUND OF THE INVENTION

1. Field of the Invention

This invention relates to reference point locator for locating a reference point, located on one side of a structure (such as a wall, floor or ceiling), from the opposite side of the structure.

2. Description of Related Art

Pin-point location of specific reference points located on one side of a structure (such as a wall, floor or ceiling) from the opposite side of the structure is commonplace in residential and commercial construction. For example, when installing a new electrical outlet, it is necessary to know where to cut a hole on one side of a wall, floor, or ceiling in order to properly line up with incoming conduit on the opposite side of the wall, floor or ceiling. A similar problem also exists with respect to installing new plumbing.

Conventionally, reference points are located by making a multitude of measurements are made on one side of the structure and then repeating the measurements on the opposite side of the structure. A hole is then drilled that extends from one side of the structure to the other side of the structure.

This approach has several disadvantages. First, this method is time consuming due to the multitude of careful measurements that must be made and the difficulty in transferring those measurements to the opposite side of the structure. Second, this approach often leads to numerous unnecessary holes being drilled that, in the end, must be patched or otherwise repaired in order to return the structure to its original condition. The unnecessary holes result from the fact that performing the required measurements often leads to confusion and the improper location of the reference point. The unnecessary holes also result from the fact that structures are often not constructed uniformly on both sides. Third, this method is costly due to the time associated with performing the initial measurements as well as the time and cost associated with patching or otherwise repairing the unnecessary holes.

BRIEF SUMMARY OF THE INVENTION

A reference point locator system according to the preferred embodiment of the invention overcomes these drawbacks of the prior art. In particular, according to a first aspect of the invention, the invention provides a locator system for locating a reference point located on one side of a structure from the opposite side of the structure. The system comprises a transmitter and a receiver. The transmitter is located at a position that defines the reference point, and includes an oscillator and an antenna that cooperate to generate an electromagnetic signal having a frequency that is in the range of 20 Hz to 20 kHz, preferably approximately 2 kHz. The receiver includes a transducer that senses the electromagnetic signal transmitted by the transmitter, and an indicator that indicates whether the receiver is within a given distance of the transmitter.

According to a second aspect of the invention, the invention provides a locator system for locating a reference point, located on one side of a structure, from the opposite side of the structure. The locator system comprises a transmitter and a receiver. The transmitter is located at a position that defines the reference point, and further includes an oscillator, an amplifier, and an antenna. The oscillator generates a first electrical signal having a frequency that is in the range of 20 Hz to 20 kHz, and preferably approximately 2 kHz. The amplifier is coupled to the oscillator, and amplifies the first electrical signal to produce an amplified electrical signal. The antenna is coupled to the amplifier and is excited by the amplified electrical signal. In response, the antenna produces an electromagnetic signal having a frequency that is determined by the frequency of the first electrical signal from the oscillator.

The receiver includes a transducer, an amplifier, a first indicator and a second indicator. The transducer is sensitive to electromagnetic signals at the frequency of the electromagnetic signal produced by the antenna, and produces a second electrical signal when the electromagnetic signal from the transmitter is sensed. The amplifier is coupled to the transducer. In turn, the first and second indicators are coupled to the amplifier. The first indicator becomes active when the transducer is within a first distance from the transmitter, and the second indicator becomes active when the transducer is within a second distance from the transmitter (the second distance being less than the first distance). The first indicator comprises either a visual indicator, an audible indicator, or a tactile indicator, and the second indicator comprises a different one of the same three types of indicators. For example, the first indicator may be an audible indicator and the second indicator may be a visual indicator.

According to a third aspect of the invention, the invention provides a method of locating a reference point located on one side of a structure from the opposite side of the structure. The method comprises generating an electromagnetic signal using a transmitter that is located at a position that defines the reference point, the transmitter being located on the one side of the structure, and sensing the electromagnetic signal using a receiver that is located on the opposite side of the structure. The sensing step further includes providing a first indication when the receiver is within a first distance of the transmitter, and providing a second indication when the receiver is within a second distance of the transmitter, the second distance being less than the first distance.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
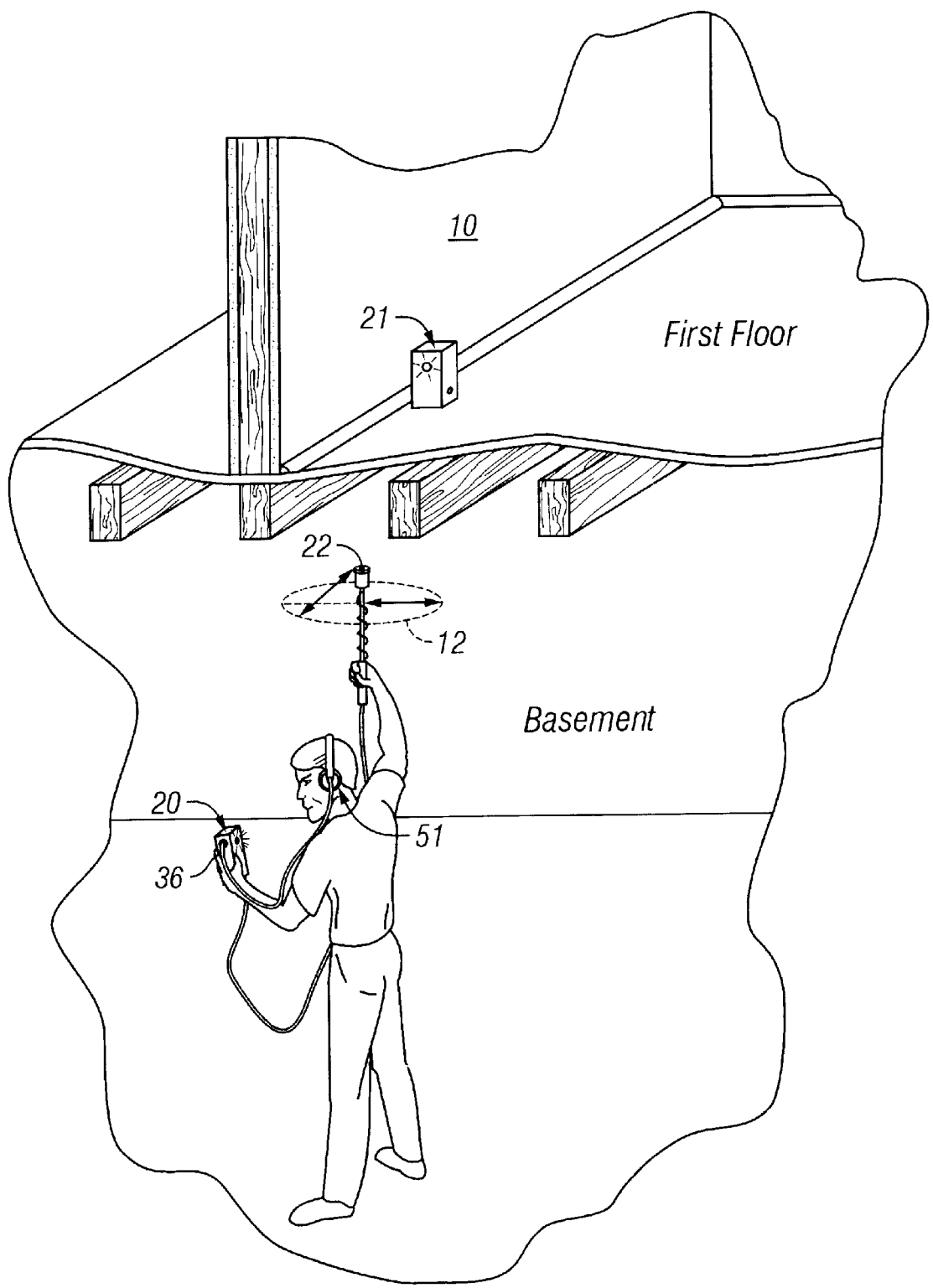
FIG. 1 is a reference point locator system according to a preferred embodiment of the present invention.

Referring now to FIG. 1, a reference point locator system according to a preferred embodiment is illustrated. The reference point locator system comprises a transmitter 21 and a receiver 20. The transmitter 21 transmits an electromagnetic signal and is placed by an operator at a position on one side of a structure to thereby define a reference point which is at or near the location of interest. In FIG. 1, the transmitter is placed near a wall 10 where a new electrical outlet is to be installed. The receiver 20 is used by an operator to facilitate location of the reference point defined by the transmitter 21, which in turn facilitates location of the spot where the new outlet is to be installed. In FIG. 1, the operator is shown to be in a basement area that is underneath the wall 10. To locate the reference point, the operator waves a transducer 22 in a search pattern 12 underneath where the transmitter 21 is believed to be located. When the transducer 22 is within a given distance of the transmitter 21 (for example, within twelve inches), an audible tone sounds in a headphone set 51, thereby providing an audible indication that the transducer 22 is within the given distance of the transmitter 21. Once the transducer 22 is within range, the headphone set 51 provides audible feedback that the transducer 22 is either moving away or getting closer to the transmitter 21. When the transducer 22 is within direct line of sight of the output beam of the transmitter 21, a light emitting diode (LED) 36 illuminates to provide indicate that the location of the transmitter 21, and thereby the reference point, has been pinpointed.

Figure 2:
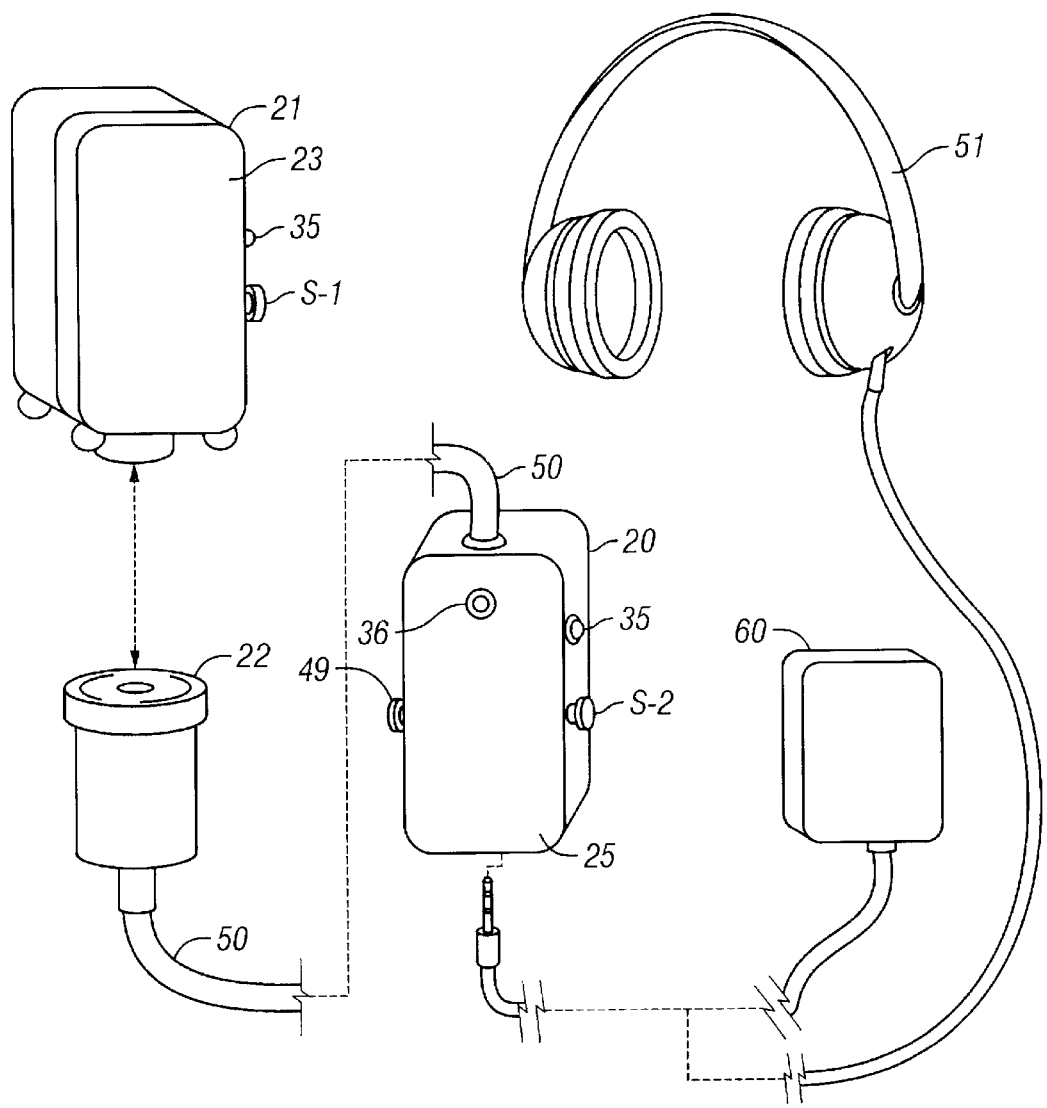
FIG. 2 shows the reference point locator system of FIG. 1 in greater detail.

Referring now also to FIG. 2, the reference point locator system is shown in greater detail. As shown therein, the transmitter 21 comprises a housing 23 that contains a transmitter circuit (described in detail in connection with FIG. 4) that permits the transmitter 21 to operate in the desired manner. A power switch S1 and a power-indicating LED 35 are also mounted on the housing 23.

The receiver 20 includes the transducer 22, the pin-point indicator LED 36, and the headphone set 51, as previously indicated. The transducer 22 is connected to a receiver housing 25 by way of a transducer cable 50. The receiver housing 25 contains a receiver circuit (described in detail in connection with FIG. 4) that permits the receiver 20 to operate in the desired manner. In like manner as the transmitter housing 23, a power switch S2 and another power-indicating LED 35 are also mounted on the housing 25. The housing 25 also has mounted thereon a gain control potentiometer 49 that adjusts the sensitivity of the receiver circuit, as well as a connector (not shown) for connecting to accessories such as the headphone set 51 and/or a vibratory indicator 60 that may be used instead of the headphone set 51.

Figure 3:
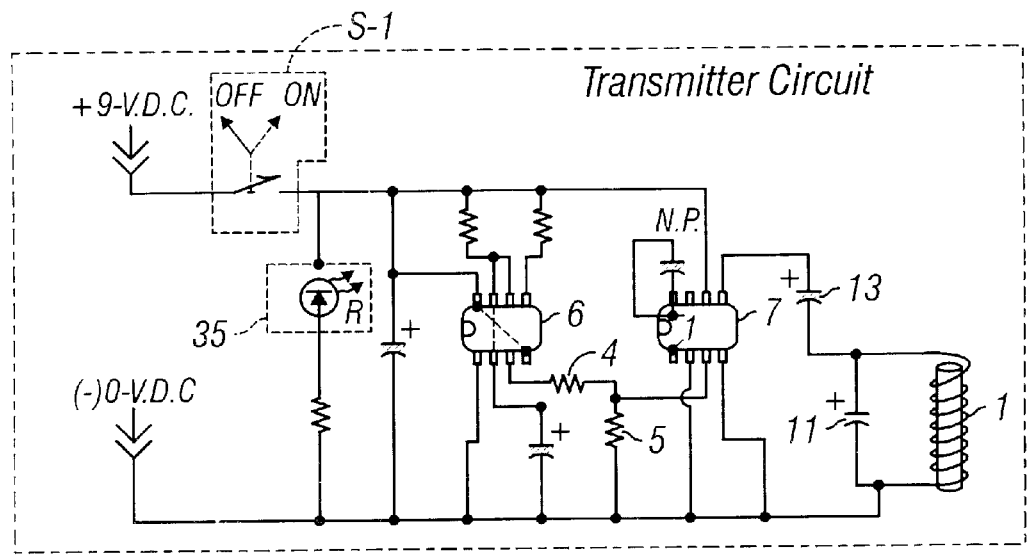
FIG. 3 is a schematic diagram of a transmitter that forms part of the reference point locator system of FIG. 1.

Referring now to FIG. 3, a preferred transmitter circuit is shown in greater detail. The transmitter circuit is an audio frequency electromagnetic signal generator, in other words, an electromagnetic signal generator that generates an electromagnetic signal or beam in the audio frequency range (20 Hz to 20 kHz). The beam is generated for a usable distance of approximately 12–18 inches in a direction that is perpendicular to an output antenna which, in the preferred embodiment, is a coil 14.

The transmitter circuit includes a voltage source (e.g., a 9 volt NiCd rechargeable battery) that is switched on by way of the switch S1 and that supplies power to the remainder of the transmitter circuit. The LED 35 is connected by way of a resistor between the switch SI and the negative terminal of the voltage source to indicate when the switch S1 is in the "on" position.

The remainder of the circuit is used specifically for generating the audio frequency electromagnetic signal and comprises primarily the coil 14, as well as an integrated circuit (IC) oscillator 6 and an IC amplifier 7. The oscillator 6 is preferably an LM555 timer connected as an astable multivibrator operating at approximately 2 kHz. The output of the timer 6 is connected by way of resistors 4 and 5, which provide gain adjustment, to the input of the amplifier 7. The amplifier 7 is preferably an LM386N, low power amplifier connected for a 200 dB gain by virtue of a non-polarized, 10 $\mu$f capacitor 8. The output of the amplifier 7 is connected to the coil 14 by way of a polarized, 100 $\mu$f electrolytic capacitor 13. An additional resonance capacitor 11 is connected in parallel with the coil 11 and allows the output signal at the coil 14 to maintain a fixed 2 kHz output frequency by virtue of the inductive-capacitive (LC) coupling of the capacitor 11 and coil 14.

In operation, the timer 6 generates an electrical signal that has a frequency of approximately 2 kHz. The electrical signal from the timer 6 is then applied to the amplifier 7, which amplifies the electrical signal. The amplified electrical signal from the amplifier 7 is then applied as an excitation to the coil 14, which in response produces an electromagnetic signal having a frequency that matches that of the timer 6, i.e., 2 kHz. A focused transmission of the electromagnetic signal from the coil 14 propagates in a cone shaped beam beginning at the transmitter source or wave guide. The beam is generated for a usable distance of approximately 12–18 inches in a direction that is perpendicular to the coil 14.

The current drain, as related to battery life in the transmitter circuit, is rated at less than 0.075 ampere hours. Advantageously, the relatively low current drain allows the operator to employ the transmitter for a period of over 8 hours using a conventional voltage source (e.g., a conventional 9 volt battery).

Figure 4:
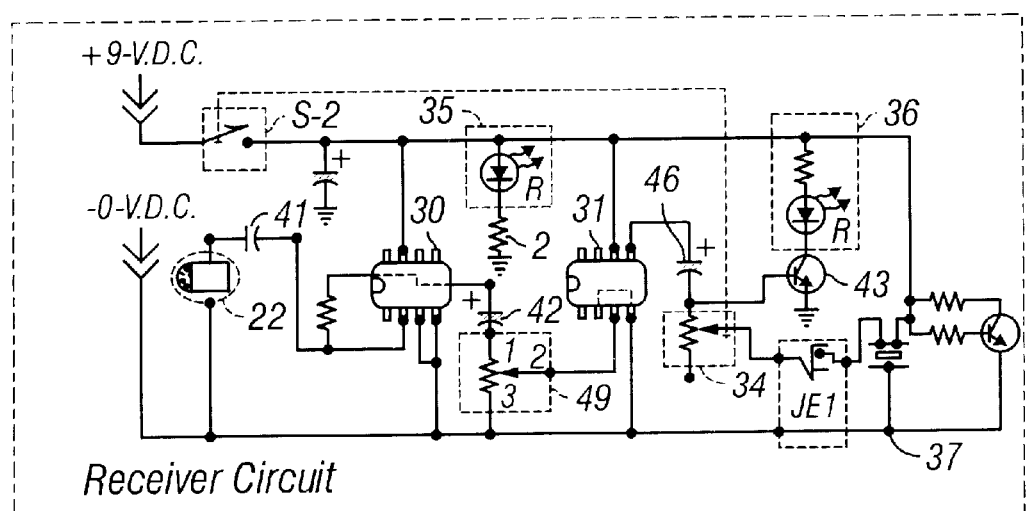
FIG. 4 is a schematic diagram of a receiver that forms part of the reference point locator system of FIG. 1.

Referring now to FIG. 4, a preferred receiver circuit is shown in greater detail. FIG. 4 also shows the connection of the transducer 22 to the remainder of the receiver circuit. The transducer 22 is preferably a narrow band, unidirectional audio frequency transducer that is sensitive to electromagnetic signals in a frequency range that generally matches the output frequency (e.g., 2 kHz) of the coil 14 of the transmitter 21 (FIGS. 1 and 2). The transducer 22 may be placed at the end of an extension handle in situations where the transmitter 21 is located higher than the operator (see FIG. 1). When the transducer 22 senses the electromagnetic signal transmitted by the transmitter 21, the transducer 22 produces an electrical signal having a frequency that matches that of the electromagnetic signal, i.e., 2 kHz.

The remainder of the circuit in FIG. 4 comprises two stages. The first stage is an audio frequency input and detection stage sensitive to the frequency of the transmitter 21 (e.g., 2 kHz). The second stage is an audio frequency amplification stage that provides an audible indication using the headphone set 51 (FIG. 2), or that provides a tactile indication using the vibratory indicator 60 (FIG. 2). The vibratory indicator 60 may be used, for example, by a hearing impaired operator or in high noise environments.

The first stage includes an operational amplifier 30 which, preferably, is a 741 op-amp delivering a large signal gain (×20,000), a slew rate of 0.5 $\mu$s, and a signal in/out rejection ratio of 90 dB. The amplifier 30, which is connected as an inverting amplifier, detects and amplifies the input signal from the transducer 22, and provides an amplified output via a coupling capacitor 42 and a variable resistor 49 to the audio frequency amplification stage. The variable resistor 49 is also shown in FIG. 2 and is used to adjust the gain or level control of the receiver circuit. For example, as the transducer 22 travels more closely to the transmitter 21, the gain of the receiver circuit can be decreased to provide finer pin point accuracy.

The audio frequency amplification stage includes an amplifier 31 which, preferably, is a low voltage audio power amplifier (e.g., LM386) connected to provide a signal to the headphone set 51, to the vibratory indicator 60, or to a piezocircuit 37 within the receiver circuit. Piezocircuit 37 can be used to provide an audio notification signal in low noise environments (i.e., the headphones are not required), and is disabled if either headphone set 51 or vibrator indicator 60 is plugged in. The amplifier 31 may for example apply a 200 dB gain to the signal from the amplifier 30. The output of the amplifier 31 is connected to a non-polarized electrolytic capacitor 46 that delivers the audio frequency signal to the volume control resistor 34, which is part of the switch S2. The volume control resistor 34 may be used in operation to turn the volume down as the transducer 22 travels more closely to the transmitter 21. The signal is then delivered to an NPN transistor 43 that is adjusted to turn on only when the coil 14 is in direct line of sight (±1 inch) with the transducer 22. When the transistor 43 turns on, the pin-point indicator LED 36 turns on, or otherwise becomes active, giving the operator a visual indication that the transducer 22 is at the center of the line of sight of the coil 14.

If the operator is hearing impaired, pin point location can be accomplished using the optional vibrating mode. While sweeping the approximate output area of the transmitter 21, an increasing level of vibration will be felt when holding the vibratory indicator 60. As with the headphone set 51, when the transducer 22 is within the line of sight of the coil 14, the pin-point indicator LED 36 turns on, giving the operator a visual indication that the transducer 22 is at the center of the line of sight of the coil 14.

Figure 5:
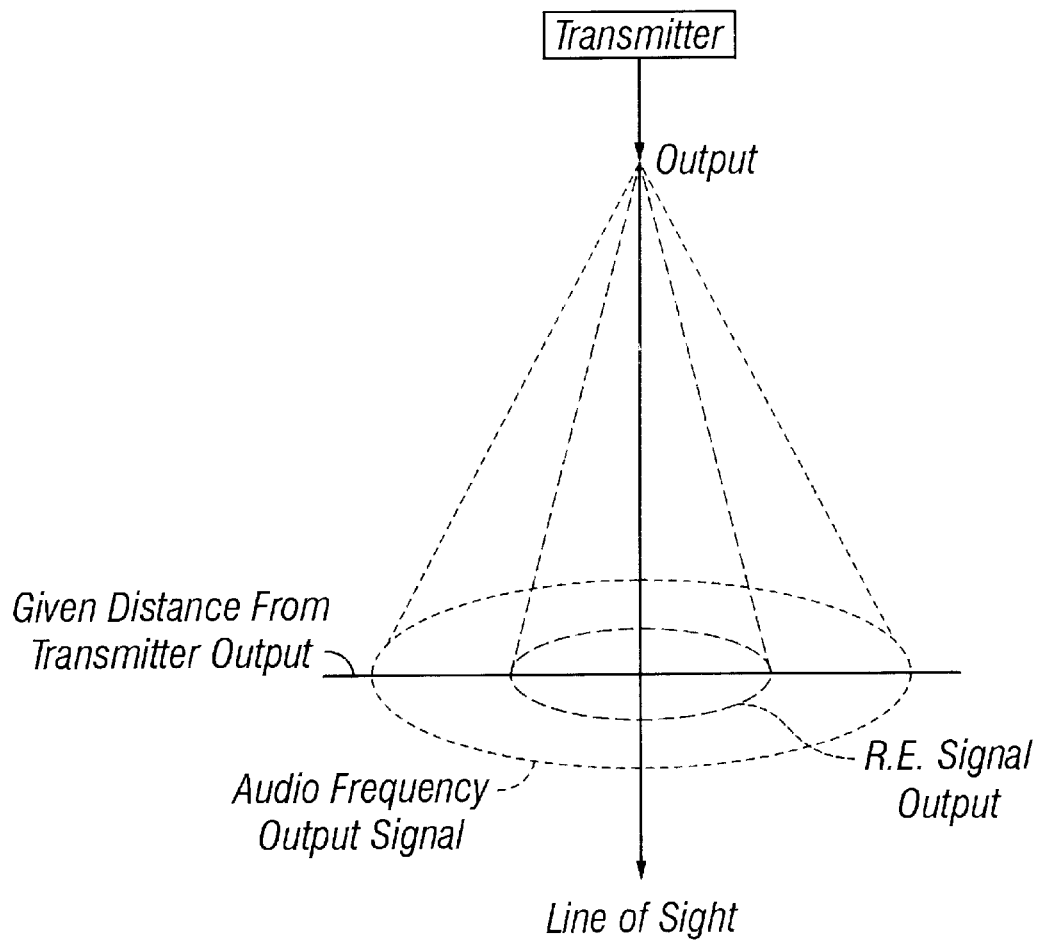
FIG. 5 shows an electromagnetic signal generated by the transmitter of FIG. 3 during the operation of the reference point locator system.

Referring now to FIG. 5, as has been indicated, the transmitter 21 preferably transmits an electromagnetic signal in the audio frequency range (20 Hz to 20 kHz, and more preferably about 2 kHz). FIG. 5 shows the advantage of using an audio frequency signal over a higher frequency signal, such as a radio frequency signal. A focused transmission of an electromagnetic signal propagates in a cone shaped beam beginning at the transmitter source or wave guide. For an audio frequency signal, at a distance of twelve or eighteen inches from the source, the cone will have a cross-sectional diameter of about twelve to fourteen inches, as compared to a cross-sectional diameter of about four to six inches for a radio frequency signal. The larger cross sectional area of the propagation cone of the audio frequency signal advantageously makes the signal detectable within a larger area and therefore makes it much easier and faster to pin point the location of the transmitter 21. Another significant advantage of an audio frequency implementation over a radio frequency implementation is that the component costs tend to be lower, thereby allowing the overall cost of the reference point locator system to be reduced.

Advantageously, the preferred reference point locator system allows a reference point on one side of a wall, ceiling or floor to be accurately located from the opposite side of the wall, ceiling or floor. System accuracy is not affected by materials used in standard construction techniques. Because the system allows reference points to be accurately located, the drilling of unnecessary holes is eliminated, thereby reducing or eliminating wasted time and cost associated with prior techniques of locating reference points. Finally, the use of an audio frequency transmitter advantageously provides a signal that is detectable within a larger area and therefore makes it much easier and faster to pin point the location of the reference point.

Many other changes and modifications may be made to the present invention without departing from the spirit thereof. The scope of these and other changes will become apparent from the appended claims.

We claim:

1. A method of locating a reference point located on one side of a structure from the opposite side of the structure, the method comprising:
    (A) generating an electromagnetic signal using a transmitter that is located at a position that defines the reference point, the transmitter being located on the one side of the structure;
    (B) sensing the electromagnetic signal using a receiver that is located on the opposite side of the structure, including:
        (1) providing a first indication when the receiver is within a first distance of the transmitter, wherein the first indicant is one of a group consisting of an audio indication, a visual indication and a tactile indication; and
        (2) providing a second indication when the receiver is within a second distance of the transmitter, the second distance being less than the first distance, and wherein the second indication is another of the group consisting of an audio indication, a visual indication and a tactile indication.

2. A method according to claim 1, wherein the electromagnetic signal has a frequency that is in the range of 20 Hz to 20 kHz.

3. A locator system for locating a reference point located on one side a structure from the opposite side of the structure, the system comprising:
    (A) a transmitter, the transmitter being located at a position that defines the reference point, the transmitter including an oscillator and an antenna that cooperate to generate an electromagnetic signal having a frequency that is in the range of 20 Hz to 20 kHz;
    (B) a receiver, the receiver including a transducer that senses the electromagnetic signal transmitted by the transmitter, and the receiver including an indicator that indicates whether the receiver is within a given distance of the transmitter; and wherein the indicator is a first indicator is a first indicator and the locator system further comprises a second indicator, from the transmitter,
        (4) a second indicator, the second indicator being coupled to the amplifier and becoming active when the transducer is within a second distance from the transmitter, the second distance being less than the first distance; and
            wherein the first and second indicators each comprise a different member of the group consisting of visual indicator, an audible indicator, and a tactile indicator.

4. A locator system according to claim 3, wherein the electromagnetic signal has a frequency that is approximately 2 kHz.

5. A locator system for locating a reference point located on one side of a structure from the opposite side of the structure, the system comprising:
    (A) a transmitter, the transmitter being located at a position that defines the reference point, the transmitter including (1) an oscillator, the oscillator generating a first electrical signal having a frequency that is in the range of 20 Hz to 20 kHz,
(2) an amplifier, the amplifier being coupled to the oscillator, the amplifier amplifying the first electrical signal to produce an amplified electrical signal,
(3) an antenna, the antenna being coupled to the amplifier, the antenna being excited by the amplified electrical signal and in response producing an electromagnetic signal having a frequency that is determined by the frequency of the first electrical signal from the oscillator; and (B) a receiver, the receiver including
(1) a transducer, the transducer being sensitive to electromagnetic signals at the frequency of the electromagnetic signal produced by the antenna, and the transducer producing a second electrical signal when the electromagnetic signal from the transmitter is sensed,
(2) an amplifier, the amplifier being coupled to the transducer,
(3) a first indicator, the first indicator being coupled to the amplifier and becoming active when the transducer is within a first distance from the transmitter,
(4) a second indicator, the second indicator being coupled to the amplifier and becoming active when the transducer is within a second distance from the transmitter, the second distance being less than the first distance; and
and wherein the first and second indicators each comprise a different member of the group consisting of a visual indicator, an audible indicator, and a tactile indicator.

6. A locator according to claim 5, wherein the first electrical signal has a frequency of approximately 2 kHz.

7. A locator according to claim 5, wherein the amplifier is coupled to the transducer by way of an additional amplifier, the additional amplifier having an adjustable gain to permit the sensitivity of the receiver to be controlled.

8. A locator according to claim 5, wherein the transducer is a narrow band unidirectional audio frequency transducer.

9. A locator according to claim 5, wherein the antenna produces an electromagnetic signal having a cross sectional diameter in the range of twelve to fourteen inches at a distance of twelve to eighteen inches from the antenna.

* * * * *